United States Patent
Weimer et al.

[11] Patent Number: 5,250,142
[45] Date of Patent: Oct. 5, 1993

[54] RUBBER SURFACE HAVING NON-STICK PLY TURN-UP BLADDER

[75] Inventors: Russell Weimer, Wytheville, Va.; Lester J. Savit, Chicago, Ill.

[73] Assignee: Longwood Elastomers, Inc., Florham Park, N.J.

[21] Appl. No.: 865,789

[22] Filed: Apr. 7, 1992

Related U.S. Application Data

[63] Continuation of Ser. No. 558,907, Jul. 27, 1990, abandoned.

[51] Int. Cl.⁵ .............................................. B29D 30/26
[52] U.S. Cl. ........................................ 156/401; 249/65; 428/36.1; 428/36.8
[58] Field of Search ............. 156/401, 166; 249/65; 428/36.1, 36.8

[56] References Cited

U.S. PATENT DOCUMENTS

| | | | |
|---|---|---|---|
| 3,101,289 | 8/1963 | Giletta et al. | 156/401 |
| 3,932,255 | 1/1976 | Sarascan | 156/401 |
| 4,381,331 | 4/1983 | Johnson | 156/166 |

OTHER PUBLICATIONS

Prior art bladders described in James L. Johnson deposition transcript—pp. 1, 42–44, 131–133, 136 and 203.

*Primary Examiner*—Michael W. Ball
*Assistant Examiner*—Francis J. Lorin
*Attorney, Agent, or Firm*—Jones, Day, Reavis & Pogue

[57] ABSTRACT

A tire ply end turn-up device comprising an inflatable first rubbery polymer bladder body, a second non-stick rubbery polymer layer on at least a portion of the surface of the bladder body, and fabric between the bladder body and the non-stick surface. The ply turn-up bladder is made by forming an uncured rubbery polymer bladder body, forming a composite of fabric calendared on one side with an uncured non-stick rubbery polymer and on the other with a rubbery polymer that will bond with the bladder body upon curing, applying the composite to at least a portion of the bladder body, and curing the bladder body and composite to form an integral turn-up bladder with a non-stick rubber surface. A rubbery polymer that will bond with the uncured bladder body upon curing is used on the fabric side that contacts the bladder body.

13 Claims, 1 Drawing Sheet

RUBBER SURFACE HAVING NON-STICK PLY TURN-UP BLADDER

This application is a continuation of application Ser. No. 558,907, filed Jul. 27, 1990, now abandoned.

BACKGROUND OF THE INVENTION

The invention generally relates to turn-up bladders used in the tire building process. More specifically, the invention relates to bladders having non-stick rubber surfaces for turning over uncured tire plys.

Tire building machines use annular inflatable rubber bladders to turn up the ends of plys of tires. During the turn-up operation, the uncured ply material is wrapped around and over the bead rings and against itself. Because the rubber ply material is tacky, the uncured ply material sticks to itself when the inflatable bladder doubles it over the beading ring.

Turn-up bladders traditionally have been made from vulcanized rubber (natural, synthetic or mixtures of the two) that has the undesirable characteristic of sticking to the tacky uncured tire plies when making contact with the uncured ply during the turn-up operation. Such momentary adhesion is especially destructive because the bladder exerts pressure against and, subsequently, away from ply. This adhesion results in possible defects to the tire ply and, after periodic use, premature deterioration of the bladder surface.

Initial attempts to deal with the problem of the bladder sticking to the ply during the tire building operation have met with only limited success. One early attempt involved applying a layer of non-stick rubber to the portion of the periphery o the bladder body contacting the ply end. Unfortunately, while the non-stick rubber did not stick to the ply, it also did not sufficiently adhere to the bladder body. After repeated operations, the non-stick rubber would begin to separate from the bladder body.

A later, alternative approach to the problem is described in U.S. Pat. No. 4,381,331 ("the '331 patent") That patent teaches replacing the non-stick surface rubber layer with a fabric having reduced adhesion to uncured rubber. The fabric is embedded in a portion of the bladder surface. This attempted solution has the disadvantages of the fabric fibers on the bladder surface becoming frayed and of the cords separating from the bladder body after extended use.

It is an object of the present invention to provide a bladder having a non-stick rubber surface that will have improved adhesion to the bladder body and reduced tendency to separate from the bladder body during use.

It is another object of the present invention to provide a non-stick ply turn-up bladder without exposed fabric cords that could fray or separate from the bladder body during use.

It is a further object of the present invention to provide an improved ply turn-up bladder with increased adhesion of a non-stick rubber surface layer to the bladder body, such that the useful life of the bladder is increased.

It is yet a further object of the present invention to provide a method of making a bladder having a non-stick rubber surface with the above-listed desirable characteristics.

SUMMARY OF THE INVENTION

The invention is a ply turn-up bladder comprising an inflatable rubbery polymer bladder body which has a non-stick rubbery polymer surface layer secured to at least a portion of the bladder body's periphery by embedding a fabric between the bladder body and the non-stick rubbery polymer surface layer. The fabric permanently and integrally bonds the non-stick rubbery polymer surface layer to the bladder body. The ply turn-up bladders preferably utilizes a third rubbery polymer layer between the bladder body and the fabric, the third rubbery polymer having a different hardness or tackiness characteristics than the bladder body or the non-stick layer.

The present invention also contemplates a method of making the improved bladder comprising forming an uncured, inflatable bladder body of a rubbery polymer and a fabric composite having rubber on both sides. The composite is formed by calendering one side of a fabric sheet with an uncured non-stick rubber polymer and calendering the opposite side of the fabric with an uncured rubber polymer capable of permanently bonding with the bladder body when cured therewith. The composite is applied to a portion of the periphery of the bladder body, and the bladder body and composite ar bonded together by curing.

DESCRIPTION OF THE PREFERRED EMBODIMENT

Figure 1:
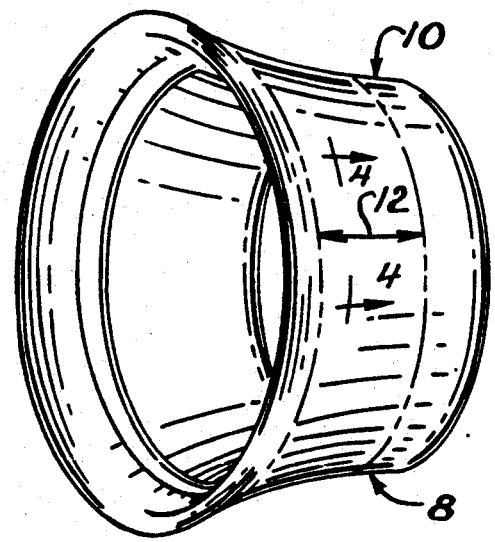
FIG. 1 is a perspective view of the preferred embodiment of the completed non-stick turn-up bladder showing the bladder body and the non-stick outer surface layer.
Figure 2:
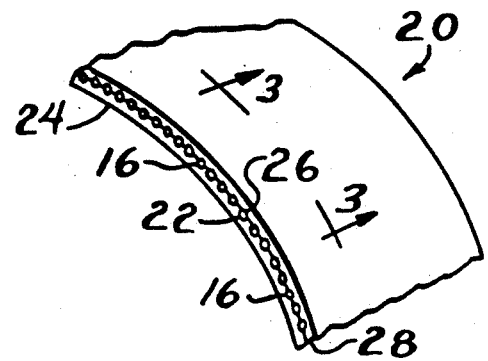
FIG. 2 is a perspec ive view of the intermediate composite that is applied to the uncured bladder body before curing.
Figure 4:
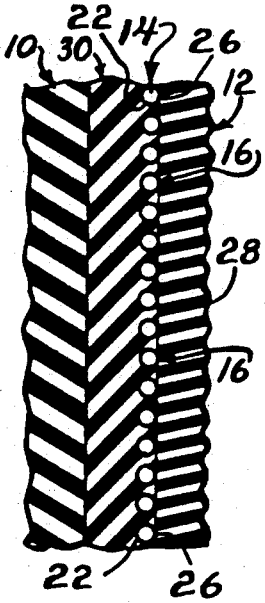
FIG. 4 is a cross-section of the preferred embodiment shown in FIG. 1.

As shown in FIGS. 1 and 4, the inventive non-stick turn-up bladder 8 comprises a bladder body 10, a non-stick rubber outer surface layer 12 covering a portion of the bladder body 10, and a textile fabric 14 between the bladder body 10 and the non-stick outer surface layer 12. The bladder body 10 may be made of a flexible rubbery polymer, preferably natural rubber, or any other material well known in the art. The bladder body 10 may also have, in its interior, reinforcing means such as a cord fabric or mylar, or any other appropriate material known in the art.

Figure 3:
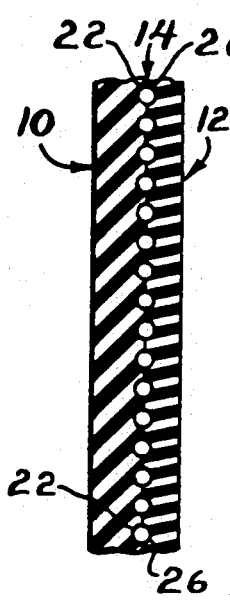
FIG. 3 is a detailed cross-section of the composite shown in FIG. 2.
Figure 5:
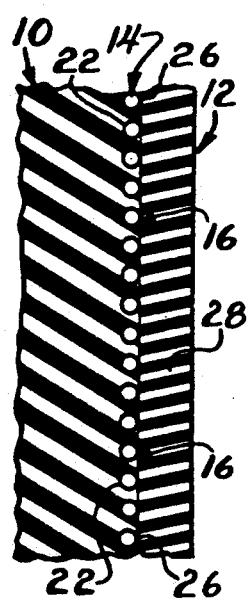
FIG. 5 is the cross-section of an alternative embodiment of the completed non-stick turn-up bladder.

The fabric 14 between the bladder body 10 and the non-stick outer surface layer 12 is an adhesion treated textile fabric, preferably polyester cord, but alternatively aramid fiber cord or other materials which are extensible in the lateral direction (allowing expansion between the cords) and which will adhere to both the bladder body 10 and the non-stick outer surface layer 12 may be used. As shown in FIGS. 3-5, the fabric 14 consists of many parallel filament cords 16 temporarily held together by thread or other means known in the art. The outer surface layer 12 preferably is a non-sticking rubbery polymer such as nitrile blends or any other rubbery material known in the art that will adhere to the fabric material but will not adhere to the types of uncured rubber normally used in tire plies.

As shown in FIG. 4, the fabric 14 permanently bonds the non-stick outer surface layer 12 to the bladder body 10 at least in part because the fabric is embedded in (and adheres to) the rubber surface layer 30 that is integrally formed with the bladder body 10. The non-stick surface layer 12 in-turn is embedded in the second, opposite side 26 of the fabric 14. Thus, the fabric enables the non-stick surface layer 12 to permanently bond to and become integral with the bladder body 10.

The inventive non-stick bladder is manufactured by forming an annular, uncured inflatable bladder body in a manner well known in the art. A composite 20 is independently formed by calendering the first side 22 of the fabric sheet 14 with a layer 24 of a rubbery polymer that will bond with the bladder body upon curing (preferably a blend of natural and nitrile rubber), and calendering the second side 26 of the fabric sheet 14 with a layer of a non-stick rubbery polymer 12 (also shown as 28 in FIGS. 2 and 4-6). (The term "calendering" is not intended to be limited to pressing of a sheet of rubber to a sheet of fabric, but includes skimming and other methods known in the art for applying rubber to fabric.)

After formation of the composite 20, it is applied to the bladder body 10 with layer 24 (also shown as 30 in FIGS. 4 and 6) in contact with a portion of the periphery of the bladder body 10 and the non-stick layer 28 facing outward. The bladder body 10 and composite 20 are subsequently cured together, as by heating or other means known in the art. As shown in FIG. 4, the curing integrally forms the layer of the first rubbery polymer layer 24 of the composite 20 with the bladder body 10. Because the two opposite layers of rubber are both in contact with the fabric, the layer of the second non-stick rubbery polymer 28 permanently adheres to the fabric 14 and also to the bonding rubbery polymer layer 24 and bladder body 10.

An alternative embodiment of the instant invention is shown in FIG. 5. This embodiment uses an intermediate rubbery polymer layer (shown as 30 in FIG. 4) that is the same rubber composition used in the bladder body 10. Upon curing, the fabric 14 permanently adheres to the layer of the intermediate rubbery polymer, which becomes indistinguishable from the bladder body 10 (as shown in FIG. 5), and the layer of the non-stick rubbery polymer 28 a previously described.

The alternative embodiment is manufactured by forming the annular inflatable bladder body 10 with an appropriate uncured rubbery polymer. The composite 20 is independently formed by calendering the first side 22 of the fabric sheet 14 with a layer of the same rubbery polymer used to form the bladder body 10 and calendering the second side 26 of the fabric sheet 14 with a layer of the non-stick rubbery polymer 28. The composite 20 is then applied to the bladder body 10 so that the layer of the bladder body type rubbery polymer on the composite 20 is in contact with a portion of the periphery of the bladder body 10. Finally, the bladder body 10 and composite 20 are cured, as by heating or any other means known in the art.

The outer, non-stick rubber of the finished bladder may have a smooth surface, as shown in FIG. 5, or a textured surface, as shown in FIG. 4. A relatively thin layer or skim coat of non-stick rubber on the fabric will create a non-stick rubbery polymer surface having a desirable ribbed texture, without the disadvantages of having an exposed fabric surface on the bladder. This textured surface also has the advantage of being created without the need for specialized molds or templates. It is anticipated that this surface may further decrease the momentary adhesion between the finished bladder and the uncured ply.

Because the rubber used for the rubber layer 24 of the composite may have lower viscosity than the non-stick rubber used for the outer layer 28, curing may cause the one layer to flow through the cords to a larger extent that the other. As shown in FIG. 4, the rubber of inner layer 30 has lower viscosity than the non-stick rubber 26, and therefore is shown as having flowed through the fabric 16 and away from the bladder body more than the outer rubber 26 flowed toward the bladder body. The magnitude of this effect will vary depending on the particular rubbery polymers used.

Figure 6:
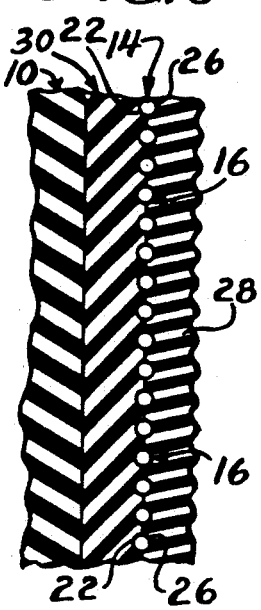
FIG. 6 is the cross-section of a second alternative embodiment of the completed non-stick turn-up bladder.

FIG. 6, on the contrary, demonstrates the use of a rubbery polymer layer 30 (shown a 24 in FIG. 2 in the uncured state) which has about the same viscosity as the non-stick rubbery polymer. Curing of that bladder would not result in a disparity of flow of rubbery polymers through the fabric 16. Thus, the different rubber materials appear equally divided on either side of the fabric after curing.

The preferred and alternative embodiments of the instant invention are described above for illustrative purposes only and as required by statute. It is understood that the invention is not limited to the particular embodiments described in this specification but may appear in different forms utilizing the same inventive concept. The scope of the invention is not governed by the specific structures contemplated above, but shall be properly judged by the following claims as interpreted by established doctrines of claim construction and equivalents.

What is claimed is:

1. A turn-up bladder having an outer surface for contacting an uncured tire ply, the bladder comprising:
    a bladder body made of a first rubbery polymer, the bladder body having an inner and an outer surface;
    a fabric secured to the outer surface of the bladder body by being at least partially embedded therein;
    a layer of a second rubber polymer on the outer surface of the bladder, the second rubbery polymer layer being in contact with the fabric on the side of the fabric opposite the bladder body, the second rubbery polymer being less adhesive to uncured tire ply than the first rubbery polymer;
    wherein the layer of second rubbery polymer is at least partially secured to the bladder body by the fabric.

2. The ply turn-up bladder of claim 1, wherein the fabric is a textile fabric treated to adhere to both the first rubber polymer and the second rubbery polymer.

3. The ply turn-up bladder of claim 2, wherein the fabric is comprised of cords and wherein there are gaps between the cords of the fabric and those gaps are at least partially filed by the secured rubbery polymer.

4. The ply turn-up bladder of claim 1, wherein the fabric is embedded in both the second rubbery surface layer and the bladder body.

5. The ply turn-up bladder of claim 1, further comprising a third rubber polymer layer embedded in the fabric and wherein the third rubbery polymer layer is integrally formed between the bladder body and the fabric.

6. The improved ply turn-up bladder of claim 5, wherein the third rubber polymer is a low viscosity rubbery polymer that is chemically bound through cross-linking with the polymer of the bladder body and the second rubbery polymer.

7. The improved ply turn-up bladder of claim 5 wherein the fabric is a treated fabric that bonds to the third rubbery polymer layer and the second rubbery polymer surface layer upon curing.

8. An improved bladder for turning-up uncured tire play, the bladder of the type having a body made of a first rubbery polymer and a surface layer on at least a portion of the bladder body's periphery made of a second rubbery polymer which is less adhesive to uncured tire ply than the first rubbery polymer;

the improvement comprising a fabric in contact with both the bladder body and the second rubbery polymer of the surface layer, the fabric at least in part securing the bladder body to the surface layer.

9. The improved ply turn-up bladder of claim 8, wherein the fabric is embedded in the bladder body.

10. The improved ply turn-up bladder of claim 9, wherein the fabric is partially embedded in the second rubber surface layer.

11. The improved ply turn-up bladder of claim 8, wherein the fabric is selected from the group consisting of polyester cord and aramid fiber cord.

12. The improved ply turn-up bladder of claim 8, wherein the second rubbery polymer layer has a textured outer surface.

13. The improved ply turn-up bladder of claim 12, wherein the fabric is embedded in a rubbery polymer different from the rubbery polymers of the bladder body and the second surface layer, and the different rubbery polymer is integrally formed with the bladder body.

* * * * *